United States Patent [19]

Daisey

[11] 3,928,917

[45] Dec. 30, 1975

[54] POSITION INDEX DEVICE AND DRAFTING APPARATUS COMBINED THEREWITH

[76] Inventor: James R. Daisey, 103 Compass Drive, Claymont, Del. 19703

[22] Filed: Nov. 15, 1974

[21] Appl. No.: 524,237

[52] U.S. Cl. .......... 33/76 R

[51] Int. Cl.² .......... B43L 13/00

[58] Field of Search .......... 33/76 R, 77, 78, 79 R, 33/80

[56] References Cited

UNITED STATES PATENTS

| | | | |
|---|---|---|---|
| 1,227,862 | 5/1917 | Wikberg | 33/79 R |
| 2,549,634 | 4/1951 | Parsons | 33/76 R |
| 2,928,177 | 3/1960 | Wilcox | 33/79 R X |
| 3,193,195 | 7/1965 | Jeffries | 33/76 R X |

*Primary Examiner*—Richard E. Aegerter
*Assistant Examiner*—Charles E. Phillips

[57] ABSTRACT

A position index device which is quickly and removably attachable along side of a linear guide bar of different makes of drafting machines for locating a carriage movably mounted on the guide bar is disclosed. The device includes a flexible index tape having scale markings thereon, an elongated tape support bar for slidably supporting the index tape, mounting brackets for mounting the index tape and tape support bar along side of the linear guide bar, each bracket having a mounting block and a clamp for clamping the mounting block adjacent one edge of the linear guide bar, separable connections for quickly connecting and disconnecting said tape support bar to and from the mounting blocks of said brackets and a position indicator for attachment to the movable carriage which is supported by the linear guide bar of the drafting machine, the position indicator cooperating with the scale markings on the position index tape to locate the position of the movable carriage.

12 Claims, 13 Drawing Figures

POSITION INDEX DEVICE AND DRAFTING APPARATUS COMBINED THEREWITH

BACKGROUND OF THE INVENTION

1. Field of the Invention

This invention relates to a movable position index device for ready attachment to and detachment from a linear guide bar of so-called "drafting machines" which have one or more straight edges, rulers, etc. connected to a carriage which is movably mounted upon a linear track or guide bar commonly referred to as an X-bar, or a Y-bar, depending upon the position of the linear track with respect to a drafting board on which the drafting machine is mounted.

2. Description of the Prior Art

An example of the so-called "drafting machine" having linear guide bars to which the present invention is adapted to be mounted is disclosed in U.S. Pat. No. 3,074,173 issued to Charles Hubbard Little on Jan. 22, 1963. The present invention, however, is adapted to be used in conjunction with other drafting apparatus having linear guide bars on which a member supporting an instrument for facilitating the drawing of lines is movably mounted.

Representative prior art patents disclosing various position index devices for drafting apparatus are listed as follows:

| | |
|---|---|
| 534,865 | 1,482,606 |
| 828,721 | 1,620,311 |
| 941,687 | 1,746,830 |
| 1,149,120 | 1,933,835 |
| 1,227,862 | 2,102,636 |
| 1,436,673 | 2,682,709 |
| 1,447,612 | 3,727,317 |
| Great Britain | 620,163 |
| Germany | 345,452 |

U.S. Pat. No. 534,865, for example, discloses fixed scales positioned along the edges of a drafting board and movable tapes having scale markings thereon, positioned along the bottom edge of the board and supported from the board by pulleys. U.S. Pat. No. 1,933,835 also discloses a movable endless tape scale which is mounted along an edge of a drafting board.

Great Britain Pat. No. 620,163, accepted Mar. 21, 1949, discloses a scaled tape mounted to slide in special grooves, or guide ways, formed in the linear member on which a drafting straight edge supporting carriage is mounted. The German Pat. No. 345,452 discloses an endless tape mounted on the edge of a drafting board and another endless tape movably mounted in a special opening formed in a horizontal straight edge member.

SUMMARY OF THE INVENTION

The present invention is an improved movable position index device for drafting apparatus.

It is an object of this invention to provide a position index device comprising an index tape and an elongated tape support bar for slidably supporting the tape, the tape bar being readily attachably and detachably mounted on a linear guide bar of different makes of drafting machines. In accordance with the present invention no alterations to the linear guide bars of commercially available drafting machines are necessary for mounting the position index device. The tape support bars are mounted on the linear guide bars of the drafting machine by simple clamping devices. The same tapes and tape support bars are readily interchangeable with different makes of drafting machines. Only the clamping devices for mounting the tape bars on the linear guide bars need be changed in accordance with the size and shape of the guide bars of the different drafting machines commercially available.

It is another object of this invention to provide an improved position index device for drafting apparatus which is simple in construction, economical to produce, and easy to install.

It is a further object of this invention to provide an improved position index device for drafting apparatus which is light in weight and does not add substantially to the inertia of moving parts of a drafting machine.

It is a further object of this invention to provide an improved position index device for drafting apparatus, the device including an elongated tape support bar and a flexible tape slidably supported by the tape support bar wherein all stress from the tape is carried by the tape support bar rather than by the parts of the drafting apparatus.

It is a further object of this invention to make available the advantages of ordinate visual measuring means to owners of many drafting machines through use of this invention.

BRIEF DESCRIPTION OF THE DRAWINGS

With the foregoing object and features in view and such other objects and features which may become apparent as this specification proceeds, the invention will be understood from the following description taken in conjunction with the accompanying drawings in which like characters of reference are used to designate like parts, and in which.

DESCRIPTION OF THE PREFERRED EMBODIMENT

Figure 1:
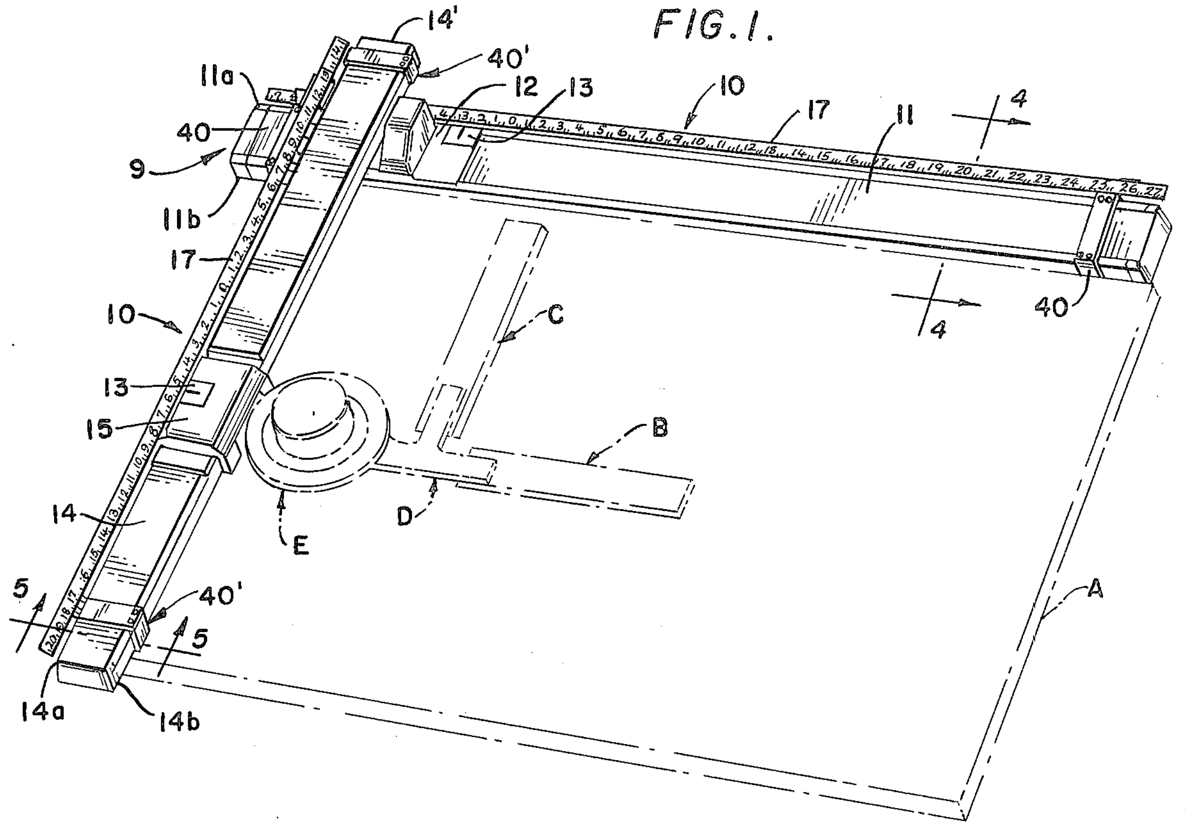
FIG. 1 is a perspective view of drafting apparatus including the present invention.

A preferred embodiment of the invention is illustrated in FIGS. 1–7. Looking particularly at FIG. 1, the arrangement of a drafting machine 9 with respect to a drafting board A is shown. The drafting machine 9 of a type commercially available, such as the machine disclosed in U.S. Pat. No. 3,074,173, is mounted for cooperation with the drafting board A to aid a draftsman in preparing a drawing on paper attached to the surface of the drafting board. The drafting machine 9 comprises a first elongated linear guide bar, or track 11, mounted horizontally adjacent the top edge of the drafting board A and a second elongated linear guide bar, or track 14 mounted vertically at right angles to the horizontal guide bar 11. These guide bars 11 and 14 are commonly referred to as an X-bar and a Y-bar respectively because of their respective horizontal and vertical positions. An X-carriage 12 mounted on the X-bar and a Y-carriage 15 mounted on the Y-bar are constrained to move linearly on the respective X and Y bars. The Y-bar is supported adjacent its upper end 14′ on the X-carriage 12 with its end 14′ projecting outwardly beyond the outer edge 11a of the X-bar. The Y-carriage 15 supports a protractor E to which is pivotally attached a ruler support D for movement about an axis normal to the surface of the board A. A pair of rulers, or straight edges B and C, extending at right angles to one another are supported by the ruler support D to move over the surface of the board A.

In accordance with the need to provide drafting machines which are suitable for making engineering drawings in relation to a zero coordinate, the improved position index device of this invention has been devised which is capable of being quickly attached and detached to the X and Y bars of drafting machines which are already in use in many drafting departments or which are presently commercially available. The position index device of the present invention requires no modification of the structure of most makes of drafting machines currently in use or readily available. Instead it is an attachment which may be quickly assembled and disassembled from the drafting machine. A minimum number of interchangeable parts are required inorder to adapt the present invention for mounting on different sizes and makes of drafting machines. In FIG. 1 a pair of similar position index devices 10 of the present invention are shown attached along side of the outside edges 11*a* and 14*a* of the X and Y bars 11 and 14 respectively. These position index devices each include a flexible tape 17 bearing on its face scale markings 18 along one or both longitudinal edges of the tape, a zero index mark 19 and numerals 19′ on opposite sides of the zero index mark designating increments of the scale in increasing order measured from the zero mark. Cooperating with the scaled tape 17 to indicate the position of the X and Y carriages are similar position indicators 13 mounted on the X and Y carriages 12 and 15 respectively. The position indicators 13 (see FIG. 6) are preferably transparent plates of rigid plastic material, such as "Lucite", or other rigid transparent material, which bear an index line 16 extending perpendicular to the outer edge 13′ thereof. These plates 13 are affixed adhesively or by other suitable means to flat upper surfaces of the carriages 12 and 15. The flexible tape 17 is slidably carried upon an elongated tape support bar 30. The tape support bar 30 consists of an interchangeable intermediate section 31 of hollow tubular stock, open at both ends, and two opposite end sections 32 each having a short stub portion 33 telescoped with respect to an open end of the intermediate section 31, an enlarged end portion 34 projecting outwardly from the short stub portion 33 and a smoothly curved surface 35 on the outer end of the end portion 34. A pair of side flanges, or lips 36 and 37 are attached to opposite sides of the end portion 34 near the bottom thereof so as to project downwardly below the bottom surface 38 and thus to provide a track which guides the tape 17. The end surfaces 35 may be coated with a coating of a low coefficient of friction material such as the synthetic resinous material "Teflon", to facilitate the sliding of the tape 17 relative to the end surfaces.

The tape 17 of the preferred embodiment 10 has opposite ends 17a and 17b which are joined by an adjustable length, yieldable tensioning connector 21 to form an endless band which encompasses the tape support bar 30 lengthwise thereof. The yieldable connector 21 includes outer and inner telescoping cylindrical members 22 and 23 which are open at one end and closed at their other end, the member 23 being telescoped within the open end of the member 22 with its closed end facing outwardly of the member 22; a coiled tension spring 28 interposed between the closed ends of the members 22 and 23 with its opposite ends 28a and 28b extending outwardly through apertures 23′ and 22′ respectively in the closed ends of the members 23 and 22; and a pair of opposite T-shaped clip members 20 which have screw threaded shanks 20′ and flat rectangular head portions 20″ welded or otherwise secured to the shanks 20′. The head portions 20″ of the pair of clip members 20 overlap the opposite ends respectively of the tape 17 and are secured to the tape ends by rivets 29 or other suitable fastening means. the shanks 20′ extend through oppositely threaded apertures 26 and 27 in the closed ends of the telescoping cylindrical members 23 and 22 respectively, and cooperate therewith in the manner of a turnbuckle so that when the outer cylinder 22 is turned in one direction the shanks 20′ will screw outwardly, and when the cylinder 22 is turned in the other direction, the shanks 20′ will screw inwardly to lengthen or shorten the adjustable connector 21. In so doing the tension on the spring 28 is adjusted. The outer cylindrical member 22 has a longitudinal slot 25 extending inwardly from its open end which provides a guide for a stud 24 projecting laterally from the outer surface of the inner cylindrical member 23. The stud 24 sliding within the slot 25 permits longitudinal adjustment of the two members 22 and 23, while preventing relative rotation thereof.

Figure 2:
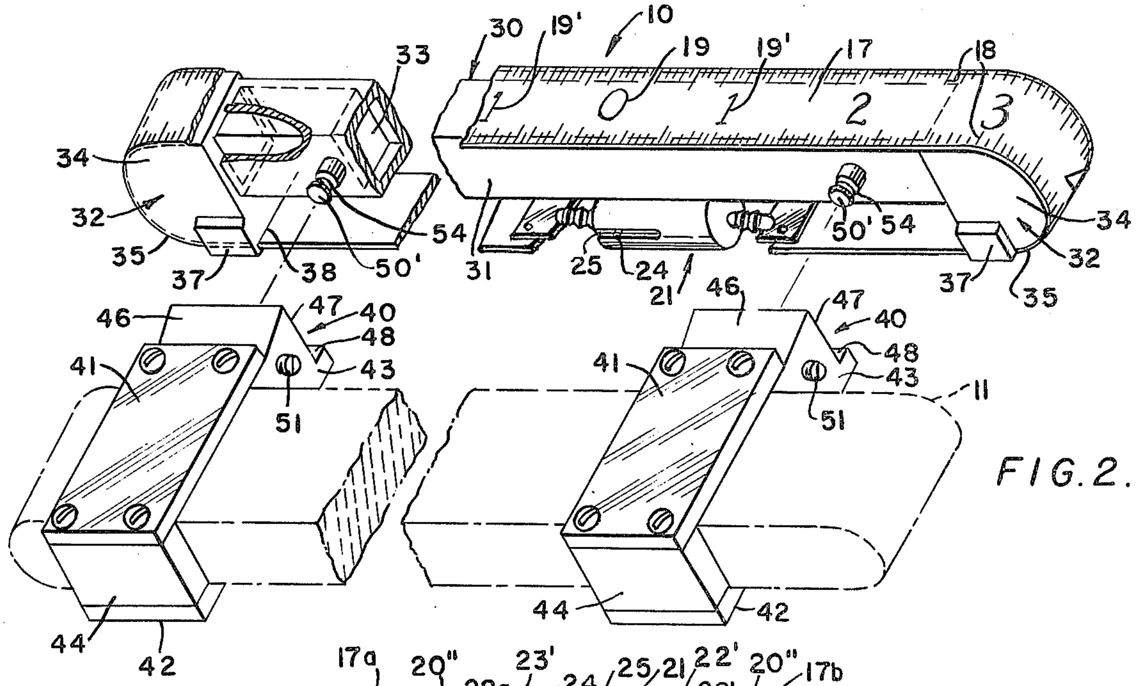
FIG. 2 is an exploded perspective view of a preferred embodiment of the invention showing portions of the invention broken away to reveal hidden details of the invention.
Figure 3:
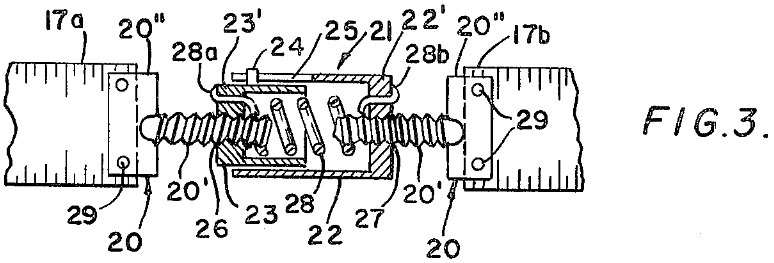
FIG. 3 is a longitudinal sectional view through the adjustable connector member joining the ends of the index tape illustrated in FIG. 2.
Figure 4:
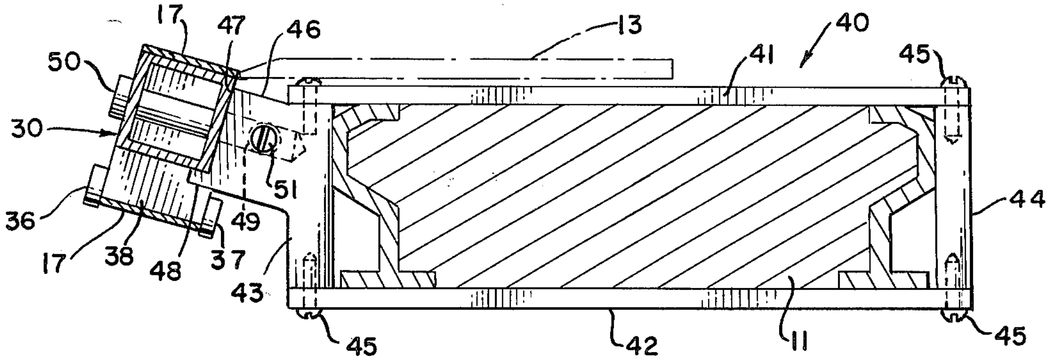
FIG. 4 is a sectional view of the invention taken along line 4–4 in FIG. 1.
Figure 5:
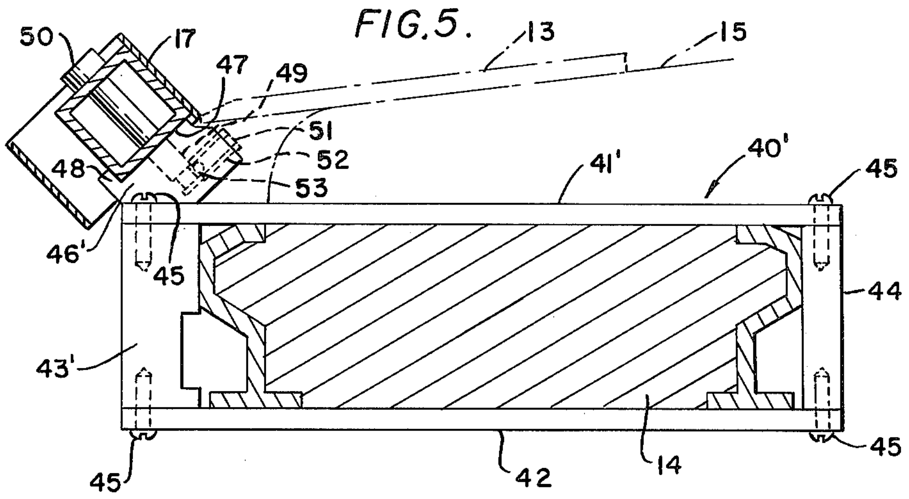
FIG. 5 is a sectional view of the invention taken along line 5–5 in FIG. 1.
Figure 6:
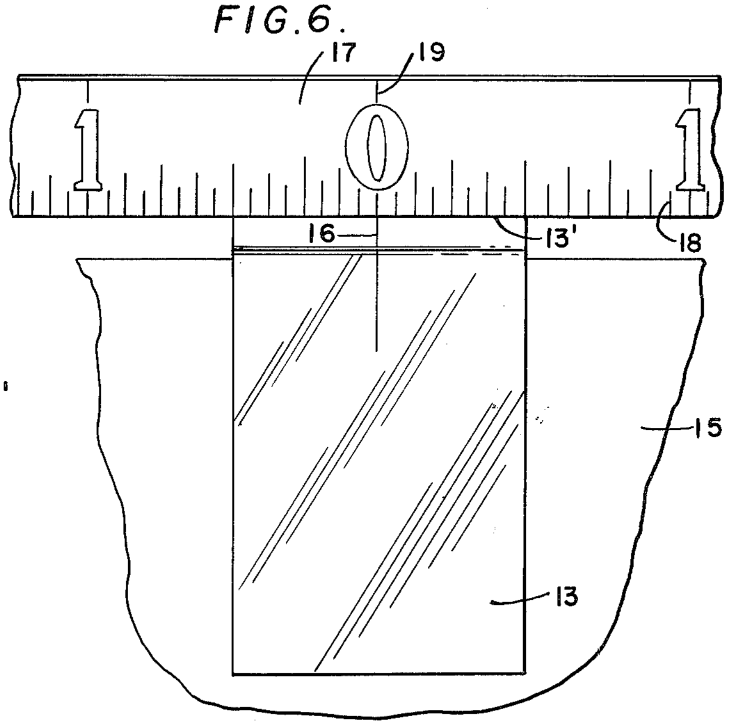
FIG. 6 is an enlarged view of a position indicator of the invention cooperating with an index tape of the invention.
Figure 7:
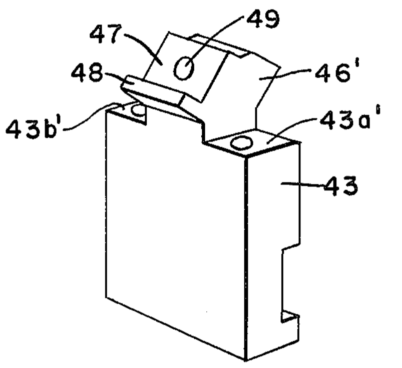
FIG. 7 is a perspective view of the tape support bar mounting block shown in FIG. 5.

A pair of brackets are provided adjacent opposite ends of the tape support bar 30 for mounting the tape support bar along side of a linear guide bar. FIGS. 2 and 4 show the mounting brackets 40 which are designed for mounting on the X-bar 11, while FIGS. 5 and 7 show mounting brackets 40′ designed for mounting on the Y-bar. Each of the brackets 40 include parallel top and bottom plates 41 and 42 respectively, and parallel end plates 43 and 44. The opposite ends of the top plate 41 are joined to the top of the end plates 43 and 44 by cap screws 45; similarly the opposite ends of the bottom plate 42 are joined to the bottom of the end plates 43 and 44. The end plate 43 has an integral block-like projection 46 which has a flat upstanding face 47 inclined to the vertical and a flat shelf 48 projecting outwardly at a right angle from the base of the upstanding face. The end plate 43 serves as a mounting block to which the tape support bar 30 is separably connected. The top and bottom plates 41 and 42 and the end plate 44 together with the headed screws 45 serve as clamping means for clamping the mounting block 43 to one side of the X-bar 11.

The separable connecting means for connecting the tape support bar 30 to one of the brackets 40 comprises a cylindrical socket 49 extending into the block 43 from and normal to the upstanding face 47, a headed pin 50 extending transversely through the tape support bar 30 from one side and projecting from its other side to provide a stud-like projection 50′ engagable in the socket 49, and a spring biased ball detent capsule 51 which is screw threaded into a bore 52 formed in block 43 normal to and intersecting the socket 49. A ball 53 projecting from the inner end of detent capsule 51 is biased downwardly into engagement with an annular groove 54 formed in and circumscribed about the stud-like projecting portion 50′. The ball 53 when engaged in the groove 54 provides releasable retaining means for holding the pin 50 in the socket 49.

The brackets 40′ are similar to the bracket 40 in all respects except for the shape of the end plate 43′ and thus the same reference numerals are used to designate parts of the bracket 40′ which have corresponding parts in the bracket 40. Whereas the end plate 43 has an integral projection 46 extending laterally from its outside surface adjacent the top thereof, the end plate 43′ has a projection 46′ which extends upwardly therefrom and centrally between a pair of flat shoulders 43*a* and 43*b*. The top plate 41′ of the bracket is sloted adjacent the block portion 46′ so that the block portion 46′ fits within the slot and opposite edge portions of the top plate on either side of the slot rest on the shoulders 43*a*′ and 43*b*′ and are secured thereon by screws 45.

As will be seen from FIGS. 1 and 4 the projecting block portion 46 of the bracket 40 is kept low so that the tape support bar 30 and tape 17 will be along side of the position indicator 13 supported by the movable Y-carriage 12. In contrast thereto as will be seen in FIGS. 1 and 5 the projecting block portion 46′ of the bracket 40′ is elevated to support the tape 17 and tape support bar 30 adjacent to the outer edge of the position indicator 13 carried by the Y-carriage 15. The position index tape 17 and tape support bar 30 supported by the X-bar must be supported at a level low enough so as not to interfere with movement of the X-carriage and the Y-bar supported thereon.

Figure 8:
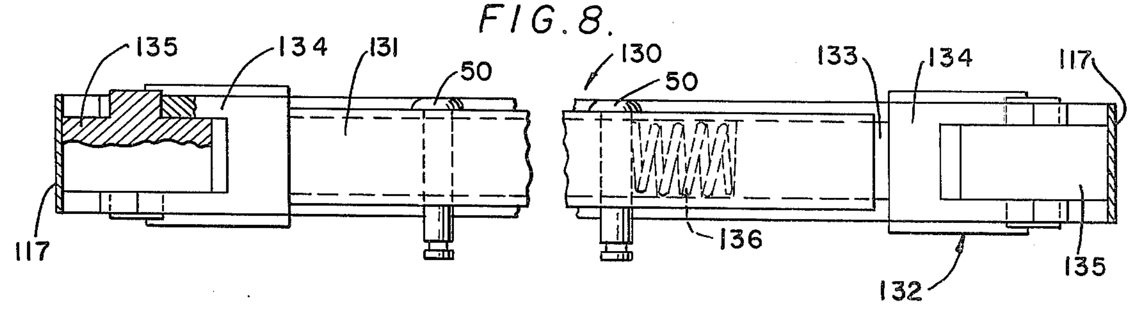
FIG. 8 is a top plan view of a modified tape support bar of the invention showing a portion of the bar and tape in section and the central portion of the bar broken away.
Figure 9:
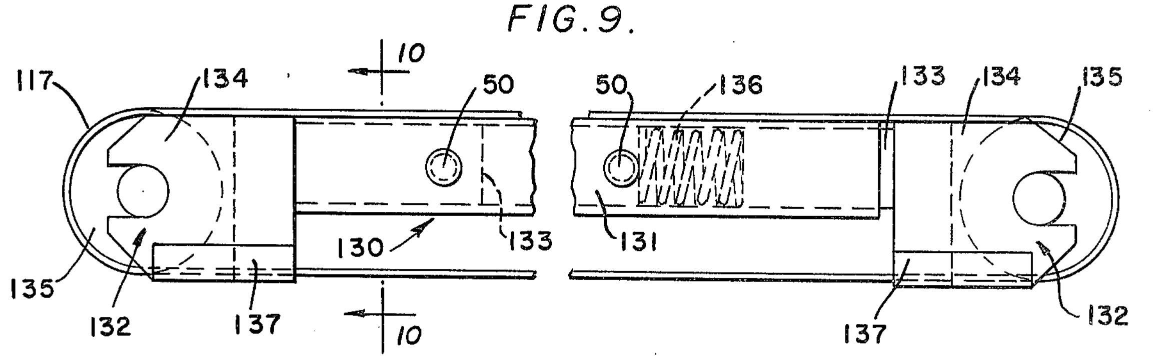
FIg. 9 is a side elevational view of the modified tape support bar shown in FIG. 8.
Figure 10:
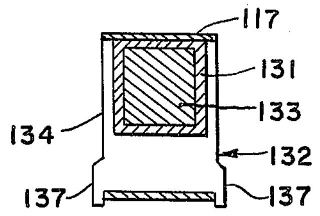
FIG. 10 is a sectional view taken on line 10–10 of FIG. 9.

FIGS. 8 and 9 illustrate a modified tape support bar 130 for supporting an endless flexible tape 117. The modified tape support bar 130 includes a tubular intermediate section 131, open at both ends, and two opposite end sections 132, each having a short stub portion 133 telescoped with respect to an open end of the intermediate section, an outer yoke 134 projecting outwardly from the short stub portion 133 and a roller 135 rotatably supported by the yoke 134. The right-hand end section 132 is biased outwardly by a coil compression spring 136 positioned within the right end of the intermediate section 131. The coil spring 136 is interposed between a tape support bar mounting pin 50, which extends transversely through the intermediate section, inwardly of an open end of the intermediate section, and the stub portion 133 of one of the end sections 132 so as to yieldingly force the end section 132 outwardly against the endless tape 117. A second tape support bar mounting pin 50 is provided adjacent the left-hand end of the intermediate section 131. The left-hand mounting pin 50 extends transversely through the intermediate section 131 and the stub portion 133 and retains the stub portion of the left-hand end section in the left-hand end of the intermediate section 131. The right-hand end section 132 under spring bias from the coil spring 136 tightens the endless tape 117 on the tape support bar 130, and it is retained in the open end of the intermediate section by the tape 117. Depending flanges or lips 137 on opposite bottom side edges of the yokes 134 of each end section 132 provide edge guides for the tape 117 which is slidably supported by the tape support bar 130. The rollers 135 on opposite ends of the tape support bar 130 provide smoothly curved movable end surfaces which facilitate movement of the endless tape 117 relative to the tape support bar.

Figure 11:
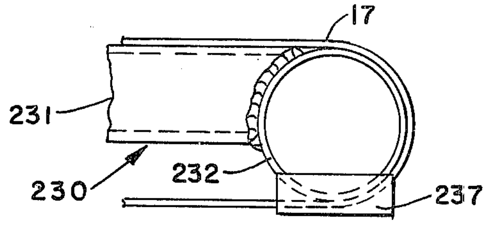
FIG. 11 is a side elevational view of an end section of still another modified form of the tape support bar.

FIG. 11 shows one end of still another tape support bar 230. The tape support bar 230 comprises a tubular intermediate section 231 having a pair of cylindrical end sections (only one shown) welded to opposite ends of the tubular intermediate section, and depending flanges 237 welded along the bottom edges on opposite sides of the end cylinders to provide edge guides for a tape 17 which is supported lengthwise about the tape support bar 230. The tape support bar 230 is optionally used as a substitute for the tape support bar 30 for mounting a tape 17 which has ends connected by an adjustable length tensioning connector 21 as described in conjunction with FIGS. 1–6.

The tape support bars 30, 130 and 230 may be made of various materials, including but not limited to, various light weight metals and alloys, steel, wood, rigid synthetic resins, and combinations. For example, the intermediate member 31 may be extruded aluminum and the end sections 32 may be of aluminum, or molded plastic such as Teflon. If the end sections 32 are of aluminum, the end surfaces 35 may be coated with Teflon to provide surfaces with a low coefficient of friction.

Usually the flexible tapes 17 and 117 will be made of steel or other non-stretchable material. When the tape support bar is made of a material having a different coefficient of expansion than the tape, provision must be made to allow for the difference in the coefficient of expansion of the material of the tape and tape support to avoid overstressing the tape or excessive play of the tape relative to the tape support. The yieldable connector 21 in the case of the embodiment shown in FIGS. 1–3 and the yieldable end on the tape support 130 function to permit a difference of expansion and contraction of a tape relative to a tape support bar.

It is within the scope of this invention that the tape support bars may be of various forms which are exemplified by but are not limited to the forms illustrated herein.

Figure 12:
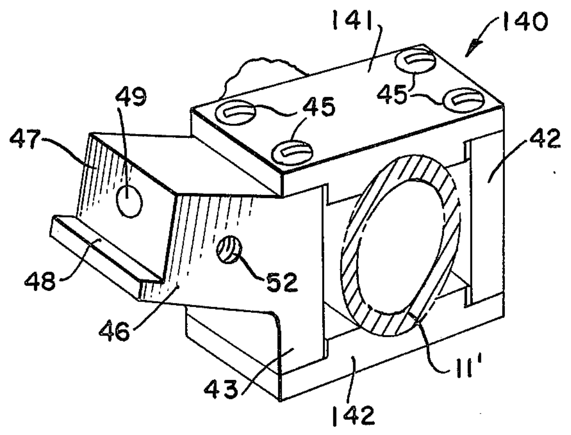
FIg. 12 is a perspective view of a tape support bar bracket for connecting the tape support bar to a round linear guide bar.

Likewise the mounting brackets for attaching the tape support bars to the linear guide bars of drafting apparatus may be of different forms including but not limited to the forms illustrated herein. The shape of the bracket will depend upon the shape of the linear guide bar of the apparatus to which it is to be attached. FIG. 12 illustrates a mounting bracket 140 for attaching a tape support bar to a cylindrical guide bar 11′. It is like the mounting bracket 40 except that top and bottom plates 141 and 142 are substituted for the top and bottom plates 41 and 42 of the mounting bracket 40. The plates 141 and 142 are provided with curved inner surfaces which mate with the curved surface of the cylindrical guide bar 11'.

Figure 13:
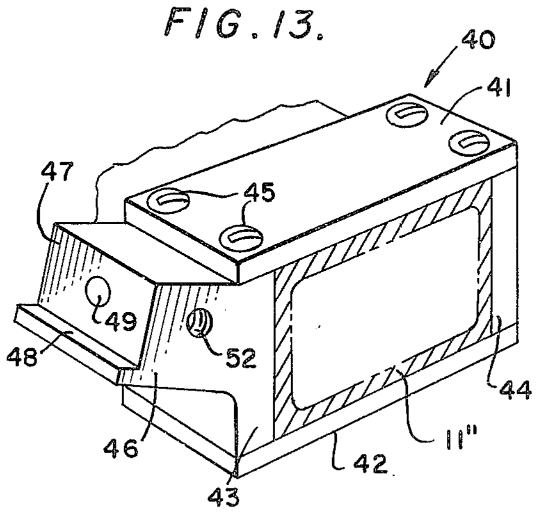
FIG. 13 is a perspective view of a tape support bar bracket of the same type illustrated in FIG. 2.

FIG. 13 shows the mounting bracket 40 clamped to a hollow linear guide bar 11'' rather than to the solid composite guide bar illustrated in FIG. 4.

Looking again at FIGS. 1–7 the operation of the position index devices 10 will now be described. Assuming that a sheet of drawing paper has been attached to the drawing board A, the X-carriage 12 will be moved along the X-bar 11 to position the Y-bar 14, the protractor E and the rulers B and C horizontally relative to the paper. The zero X and Y coordinates on the paper will be selected and the tapes 17 located along the X and Y bars 11 and 14 will be moved to position the zero marks on the tapes 17 to correspond with the selected zero X and Y coordinate position on the paper. Once the tapes 17 along the X and Y bars have been adjusted to correspond with the selected zero X and Y coordinate positions on the paper, the tapes will not be moved again until new zero X and Y coordinates are selected for the same drawing or a different drawing. By moving the Y-carriage up or down relative to the zero mark on the tape 17, a draftsman can lay out equally spaced parallel horizontal lines using the scales on the tape 17 and the ruler B. Similarly by moving the X-carriage 12 horizontally relative to the zero mark on the tape 17 adjacent the X-bar, the draftsman can lay out equally spaced vertical lines using the scale on the tape 17 and the ruler C.

The position index tapes 17 and their support bars 30 may be quickly interchanged with other tapes 17 and support bars 30 by pulling the tape bar 30 outwardly relative to the brackets 40 thus causing the ball detents 53 to yield and release the pins 50 so that the pins may be pulled out of the sockets 49 in the mounting blocks 43. If desired new tapes 17 with different scales may be positioned on the support bar 30 just removed and the support bar with new tape can be quickly replaced by reinserting the pins 50 in the sockets 49 and pushing the support bar toward the mounting brackets until the detents 53 engage the grooves 54 near the end of the pins 50 to releasably retain the pins in the sockets.

The tapes 17 may have more than one scale thereon and masks may be provided for use with the indicators 13 to cover the scale not being used. Very accurate scaling can be obtained with the position index devices of this invention using tapes with precise scales and vernier indicators (not shown).

While a preferred embodiment and several modifications of the present invention have been described, other modifications may become apparent to those skilled in the art to which the invention relates. Accordingly it is not desired to limit the invention to this disclosure, and various modifications and equivalents may be resorted to, falling within the spirit and scope of the invention as claimed.

What is claimed is:

1. A position index device for attachment to drafting apparatus said apparatus having at least one elongated linear guide bar mounted adjacent and parallel to edge of a drafting board, a carriage mounted upon said linear guide bar and constrained to move linearly thereon, and means supported by said carriage for facilitating the drawing of lines, said position index device comprising a flexible position index tape having scale markings thereon, an elongated tape support bar on which said index tape is movably mounted, bracket means for mounting said elongated tape support bar along side of said elongated linear guide bar in spaced parallel relationship thereto, said bracket means and said tape support bar having separable pin and socket connecting means for quickly connecting and disconnecting said tape support bar to and from said bracket means, and a position indicator means positionable on said carriage for indicating the position of said carriage with respect to the scale markings on said tape, said bracket means including at least one mounting block to which said tape support bar is separably connected and clamping means for detachably clamping said mounting block to said elongated linear bar, said mounting block having a flat upstanding face and a flat shelf projecting at a right angle from the base of said face on which said tape support bar rests, said separable connecting means comprising a socket extending into said block from and normal to said face, a pin projecting from said tape support bar and engagable in said socket, and detent means extending into said socket for releasably retaining said pin in said socket.

2. The device according to claim 1 wherein said clamping means comprises separable clamping segments for encompassing said elongated linear bar.

3. The device according to claim 1 wherein said tape support bar comprises an elongated tubular intermediate section having a top surface and opposite open ends, and a pair of opposite end sections, each having a short stub portion telescoped with respect to an open end of said intermediate section, an enlarged end portion projecting outwardly from said short stub portion, and smoothly curved surface means on the outer end of said end portion, said position index tape being positioned to encompass said elongated support bar longitudinally thereof with a portion of said tape overlying said flat top surface and other portions of said tape looped around said opposite end sections and under said support bar, said tape being movable over said support bar to present different portions of said tape over said top surface.

4. The device according to claim 3 wherein said enlarged end portion on each of said opposite end sections includes means for rotatably supporting a roller at the outer end thereof, and wherein said smoothly curved surface means is a roller supported by said rotatably supporting means.

5. The device according to claim 4 wherein said intermediate section has abutment means adjacent one of said open ends and compression spring means at said one open end of said intermediate section interposed between said abutment means and the telescoped stub portion of one of said opposite end sections for biasing said one end section outwardly with respect to said one open end of said intermediate portion against said position index tape which is looped around said opposite end sections.

6. The device according to claim 3 wherein each of said end sections have spaced guide means for guiding said tape along a fixed path.

7. The device according to claim 3 wherein said tubular intermediate section and said stub portions are rectangular in cross section.

8. The device according to claim 3 wherein said smoothly curved surface means is an integral rounded end surface of said end portion.

9. The device according to claim 8 wherein said rounded end surface is of a synthetic resinous material having a low coefficient of friction.

10. The device according to claim 9 wherein said low coefficient of friction material is Teflon.

11. The device according to claim 8 wherein said position index tape has a pair of opposite ends, a zero index mark positioned medially with respect to said ends, scale markings on opposite sides of said zero index mark, and numerals on said tape on opposite sides of said zero mark designating increments of said scale in increasing order from said zero mark to the ends of said tape, and resilient biasing means connecting the ends of said tape to draw said tape tightly against the ends of said tape support bar.

12. The device according to claim 11 wherein said resilient connecting means is adjustable for increasing or decreasing the bias on said tape.

* * * * *